US009967806B2

(12) United States Patent
Malassis et al.

(10) Patent No.: US 9,967,806 B2
(45) Date of Patent: May 8, 2018

(54) DEVICE AND METHOD FOR SELECTING A VISITED NETWORK

(75) Inventors: Loïc Malassis, Neuilly-sur-Seine (FR); Frédéric Maro, Antony (FR); Cyril Hullin, Paris (FR)

(73) Assignee: MOBIQUITHINGS, Valbonne (FR)

( * ) Notice: Subject to any disclaimer, the term of this patent is extended or adjusted under 35 U.S.C. 154(b) by 132 days.

(21) Appl. No.: 14/119,784

(22) PCT Filed: May 25, 2012

(86) PCT No.: PCT/EP2012/059888
§ 371 (c)(1),
(2), (4) Date: Jan. 15, 2014

(87) PCT Pub. No.: WO2012/160201
PCT Pub. Date: Nov. 29, 2012

(65) Prior Publication Data
US 2014/0120909 A1    May 1, 2014

(30) Foreign Application Priority Data

May 25, 2011    (FR) ...................................... 11 54567

(51) Int. Cl.
*H04W 4/00*    (2009.01)
*H04W 48/16*    (2009.01)
*H04W 48/18*    (2009.01)
*H04W 8/18*    (2009.01)

(52) U.S. Cl.
CPC ........... *H04W 48/16* (2013.01); *H04W 48/18* (2013.01); *H04W 8/183* (2013.01)

(58) Field of Classification Search
CPC ..................................................... H04W 48/16
USPC ................ 455/434, 552.1, 551, 435.2, 435.3
See application file for complete search history.

(56) References Cited

U.S. PATENT DOCUMENTS

| 6,212,372 | B1 | 4/2001 | Julin | |
|---|---|---|---|---|
| 2002/0154632 | A1* | 10/2002 | Wang | H04W 48/18 370/389 |
| 2004/0242260 | A1* | 12/2004 | Lescuyer | H04W 36/14 455/525 |
| 2007/0275717 | A1 | 11/2007 | Edge | |
| 2008/0004024 | A1* | 1/2008 | Puri | H04W 48/18 455/436 |
| 2008/0160958 | A1* | 7/2008 | Abichandani | H04M 1/72563 455/410 |
| 2010/0048205 | A1 | 2/2010 | Guilford et al. | |
| 2010/0330986 | A1* | 12/2010 | Rahman | H04W 48/18 455/432.1 |

(Continued)

FOREIGN PATENT DOCUMENTS

| EP | 2268090 | 12/2010 |
|---|---|---|
| WO | 92/19078 | 10/1992 |
| WO | 20071103975 | 9/2007 |

*Primary Examiner* — Chuck Huynh
(74) *Attorney, Agent, or Firm* — Hauptman Ham, LLP

(57) ABSTRACT

Device located in a mobile telephony infrastructure, that is capable of selecting a visited network and/or a host network, and of connecting a mobile terminal to said visited network selected via said selected host network, wherein said device is located in said mobile terminal, and wherein the selection is dynamically carried out through a sequencing according to at least one criterion.

31 Claims, 1 Drawing Sheet

(56) References Cited

U.S. PATENT DOCUMENTS

2012/0243436 A1* 9/2012 Hind .................... H04W 48/18
370/254

* cited by examiner

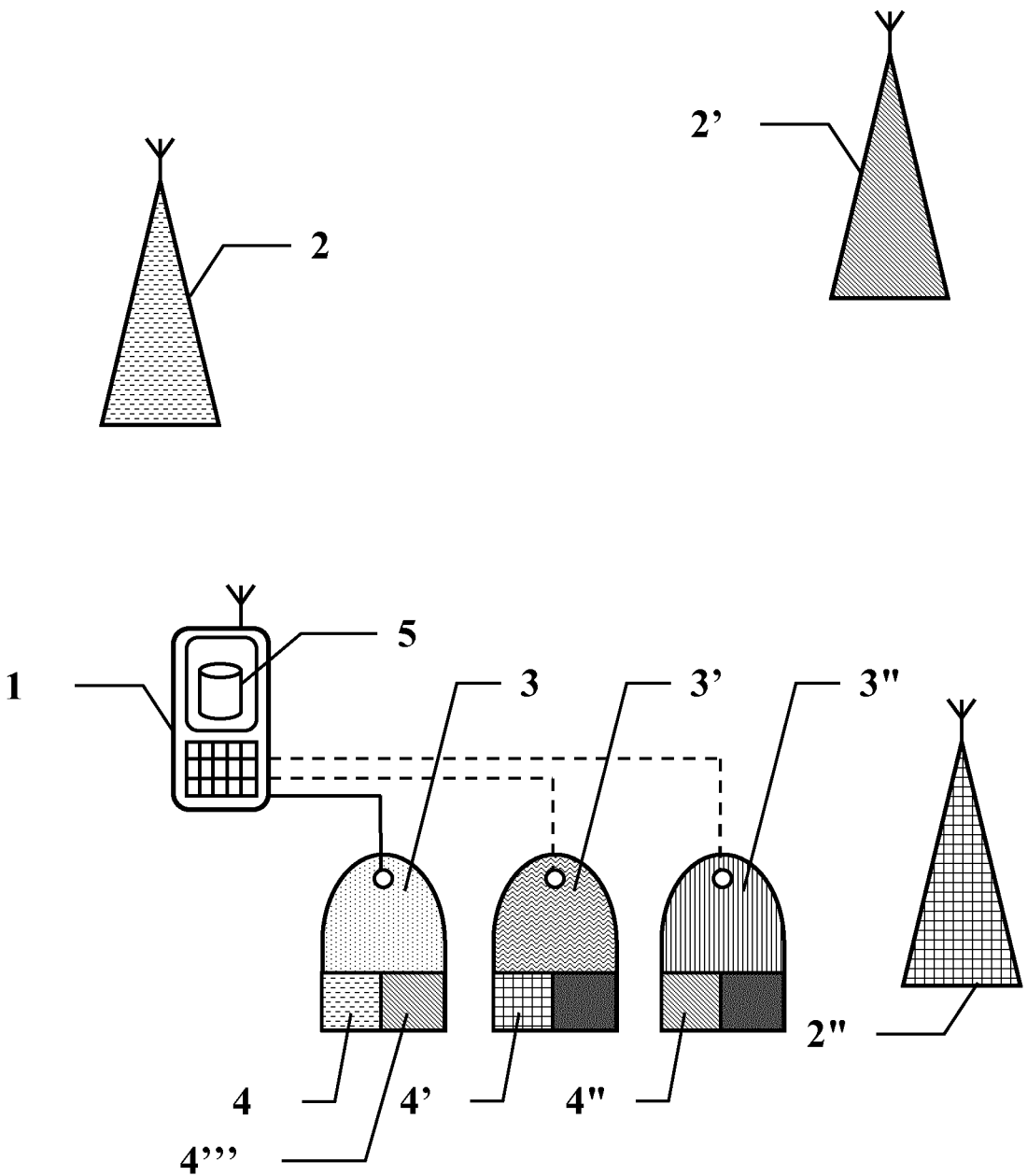

DEVICE AND METHOD FOR SELECTING A VISITED NETWORK

FIELD

The technical field of the disclosure is that of mobile telephony, particularly the optimization of the selection of a network in the case of a roaming user having communication means connected via a SIM card, such as a mobile phone.

BACKGROUND

The problem faced by a roaming mobile terminal user is firstly to be able to connect to a network to access the various voice, messages, data services, etc., and secondly when the supply host network becomes plural, to optimize the selection of a network.

It is appropriate here to distinguish a host network to which a user has a right of access, for example through a subscription for its mobile terminal, from a visited network. The right of access is materialized, for example, by a SIM card, and especially by an IMSI code that uniquely identifies said mobile terminal to the host network.

In his/her of usual circulation area, the user connects his/her mobile terminal to a regular host network via at least one cell of said host network located within the range thereof. However when travelling, roaming away from said host network range, this is no longer possible. Instead when roaming, the user connects his/her mobile terminal via a cell within range, with said cell belonging to a visited network.

The operators of the different networks which operate, as appropriate, as host or visited network, enter in reciprocal agreements and roaming agreements, in particular according to their geographic coverage, thus enabling a user to temporarily "borrow" the means of a visited network to connect, provided an agreement has been signed between said visited network and the host network. The network host manages the billing of services to the user if the latter uses a visited network having a roaming agreement with the host network.

In some applications, the selection of the visited network is arbitrated by a list of ordered preference of networks. This list is managed and updated by the (host) network operator. It is then downloaded to the mobile terminal typically by means of an OTA (Over The Air) protocol. The network regularly queries the mobile terminal for the values of various criteria. Depending on these values, the system updates the preference list and downloads it to the mobile terminal. Such a process requires the exchange of significant volumes of data and high associated costs and, in addition, the duration thereof entails a significant lack of reactivity. Such a process, which can be operated by a list of preferred networks, is by definition, static: switching from one network to another one in the list between two updates is possible only in case of loss of the signal from a network placed higher in the list.

The various networks, sometimes acting as a host network and sometimes as a visited network, negotiate roaming agreements. For a given geographic area, a host network does not necessarily have an agreement with all the networks available in this geographic region and thus does not offer a user an optimal coverage and/or for the best price.

Then a need exists to optimize the selection of the visited network, in order to have the best quality of available network and/or the most advantageous agreements between the operators.

SUMMARY

For this purpose or other purposes, the disclosure provides for a device in a mobile telecommunication infrastructure, capable of selecting a visited network visible to the mobile terminal and of connecting to said selected visited network a mobile terminal associated with a host network, that said device is located in said mobile terminal, that it is so configured as to be able to select a host network among a plurality of host networks not visible to the mobile terminal and so as to change the host network associated with the mobile terminal by substituting said selected host network for it, and that it is so configured as to be able to carry out both the selection of the host network and the selection of the visited network through a sequencing taking into account at least one criterion.

Thus, at least one embodiment enables, directly at the device present in the mobile terminal and in a given geographic location, the selection of the host network as well as the selection of a visited network detected by the mobile terminal. The mobile terminal can then access all the roaming agreements signed by on the one hand a host network operator among a plurality of host network operators and on the other hand a visited network operator among a plurality of visited networks operators.

Unlike the existing solutions, the mobile terminal incorporating a device according to at least one embodiment according to the disclosure is not limited to those visited networks having signed an agreement with the single host network which the mobile terminal is usually associated with. The selection of the visited network among the visited networks accessible by the mobile terminal can therefore be dynamically carried out from the terminal while limiting the volume of data exchanged with the core of the network.

At least one embodiment advantageously enables the mobile terminal to locally manage the connection, and enables improved reactivity to the changes brought in the criteria as perceived by the terminal.

At least one embodiment of the present disclosure concerns a device in a mobile telecommunication infrastructure, capable of selecting a visited network and of connecting to said selected visited network a mobile terminal, wherein said device is located in said mobile terminal, and where the selection is carried out through a sequencing taking into account at least one criterion.

Optionally, one or more embodiments of the disclosure may further comprise at least any one of the following optional characteristics:

The device is so configured that the selection of the visited network is dynamically carried out. Advantageously, the device is so configured that the selection of the host network is dynamically carried out.

According to another characteristic of at least one embodiment according to the disclosure, the device comprises a software program stored in a card or a chip equipped with a microcontroller and adapted to cooperate with the mobile terminal for carrying out said one or more selection(s) and the connection. Typically, the card is a SIM card. Typically, the chip is a SIM card chip.

According to another characteristic of at least one embodiment according to the disclosure, the device is so configured as to carry out the selection of the visited network while taking into account at least a first criterion and so as to carry out the selection of the host network while taking into account at least one second criterion different from the first criterion.

According to another characteristic of at least one embodiment according to the disclosure, the device is so configured as to take into account at least one common criterion to carry out the selection of the visited network and the selection of the host network.

According to another characteristic of at least one embodiment according to the disclosure, the device is so configured that said at least one criterion is selected from:
- a power level of the received radio signal,
- a type of service provided,
- a type of service available,
- a bandwidth provided,
- a quality of service,
- latency,
- one time/day,
- a user preference,
- a cost of use,
- a geographic criterion, or
- a visited network.

According to at least one embodiment, the criterion is determined by the mobile terminal itself or the device itself. According to the at least one embodiment, the criterion is not determined by a network element and is then sent to the mobile terminal.

According to another characteristic of at least one embodiment according to the disclosure, the device is so configured as to take into account the measurements made by the mobile terminal to evaluate the criterion.

According to another characteristic of at least one embodiment according to the disclosure, the device is so configured as to receive a value of the power level of the signal received by the mobile terminal or a value of the bandwidth, with said values being determined by the mobile terminal.

According to another characteristic of at least one embodiment according to the disclosure, the device is so configured that the selection of a visited network and the selection of a host network uses management rules rating each visited network detected by the mobile terminal and each host network among the plurality of host networks, according to said at least one criterion.

According to another characteristic of at least one embodiment according to the disclosure, the device is so configured that the selection of a visited network and the selection of a host network uses management rules rating, according to said at least one criterion, pairs each formed by a visited network detected by the mobile terminal and a host network among the plurality of host networks.

According to another characteristic of at least one embodiment according to the disclosure, the device is so configured that said sequencing used for selecting a visited network and for selecting a host network produces a list of visited networks and a list of host networks, ordered in order of preference.

According to another characteristic of at least one embodiment according to the disclosure, the device is so arranged as to periodically update said ordered list.

According to another characteristic of at least one embodiment according to the disclosure, the device is so configured that said ordered list is event-updated, upon the occurrence of at least one event selected from:
- activation of a SIM card,
- loss of a signal,
- discovery of a signal,
- activation of a mobile terminal,
- change in a user preference,
- external activation, or
- reception of a call or a message.

In some embodiments, typically the message is an e-mail, a SMS, a MMS or a GPRS data transmission.

According to another characteristic of at least one embodiment according to the disclosure, the device is so configured that the updating of said list of visited networks, host networks respectively, is temporally filtered in order to avoid unwanted changes in the visited network, host network respectively.

According to another characteristic of at least one embodiment according to the disclosure, the device is so configured that the selection of the visited network may be carried out not simultaneously with the selection of the host network.

According to another characteristic of at least one embodiment according to the disclosure, the device is so configured that the frequency of the selection of the visited network is different from the frequency of the selection of the host network.

According to another characteristic of at least one embodiment according to the disclosure, the device is so configured as to comprise, for each host network among the plurality of host networks, an identifier uniquely identifying the mobile terminal, with the device being further so configured that the mobile terminal assumes the identifier associated with the selected host network to connect via said selected host network.

In other words, in some embodiments, the mobile terminal is able to change its identifier to assume an identifier among said at least one identifier of the selected host network, to connect via said host network. In some embodiments, the identifier is an IMSI number.

Advantageously, in some embodiments, a unique MSISDN number is associated with all the identifiers (e.g. IMSI numbers) that uniquely identify the mobile terminal. Thus, the user of the mobile terminal can be reached at the same phone number whatever the assumed identifier, i.e. whatever the host network it is connected to. This advantageously provides continuity of service to the user and its correspondents, in a transparent manner, while allowing selecting the most appropriate host network.

Advantageously, in some embodiments, the device is so configured that, in a given geographic area, the device carries out both the selection of the host network and the selection of the visited network.

According to another aspect of the disclosure, a mobile terminal is provided, which comprises a device according to the disclosure.

According to at least one an advantageous embodiment, the device includes a software program stored in a smart card or a chip equipped with a microcontroller and adapted to cooperate with the mobile terminal to carry out said selection(s) and the connection, and wherein the mobile terminal and the card or the chip are so designed that the card or the chip can be removed from or inserted into the mobile terminal by the user.

In some embodiments, the mobile device is a phone, a personal digital assistant, usually known by the acronym PDA, a laptop equipped with a communication function using a telephone or any other (wireless) communication means.

Another aspect of at least one embodiment according to the disclosure relates to a method for a mobile telecommunication infrastructure, comprising a step of selecting a visited network and a step of connecting to said selected visited network a mobile terminal associated with a host network that it comprises a step comprising selecting a host network among a plurality of host networks associated with the mobile terminal, selecting the host network and the selection of the visited network being carried out in said mobile terminal and using a sequencing taking into account at least one criterion.

In some embodiments, the selection of the visited network and/or the selection of the host network are dynamically carried out.

According to at least one advantageous and optional embodiment, each host network among the plurality of host networks is associated with an identifier uniquely identifying the mobile terminal. In addition, the mobile terminal assumes the identifier associated with the selected network host to connect via said selected host network.

According to at least one advantageous and optional embodiment, each mobile terminal is associated with a unique phone number (e.g., MSISDN), a database is maintained wherein the phone number unique to every mobile terminal is associated with all the identifiers associated with the host networks for the mobile terminal. Thus, the mobile terminal can be called to a single call number whatever the assumed identifier.

The device is so configured as to select both a host network and a visited network at a given time and/or in the same position of the mobile terminal. Thus, at a given location, the device is so configured as to select a host network among several host networks not accessible to the mobile terminal from this location (i.e. they are not within the range of the mobile terminal) and is so configured as to select a visited network among several visited networks accessible from this location by the mobile terminal (i.e. they are within the range of the mobile terminal). Depending on the sequencing criteria, the device carries out the double selection of the host network/visited network.

In some embodiments, the host networks are not within the range of the mobile terminal and the visited networks are within the range of the mobile terminal when the device carries out the selection of the host network and the selection of the visited network. In some embodiments, the mobile terminal is preferably in a roaming or conventional travelling situation.

Another aspect of at least one embodiment according to the disclosure relates to a method for a mobile telecommunication infrastructure, for determining a coverage mapping of a given geographic area. This method comprises a step of recovering data from fixed or mobile terminals present in the geographic area. Such data relates to at least one of the following parameters: visited network, host network, or terminal location for a determined period of time.

Another aspect of at least one embodiment according to the disclosure relates to a computer program product comprising instructions adapted to be executed by a computer, with said instructions making it possible to implement the method.

According to one or more embodiments, the disclosure also relates to a card containing a microprocessor and storage means comprising a computer program containing instructions for implementing the method. According to at least one advantageous embodiment, the card is so configured as to be inserted into and removed from the mobile terminal by the user.

BRIEF DESCRIPTION OF THE FIGURES

Other characteristics, details and advantages of the disclosure will become apparent from the detailed description given below for information in connection with the drawings in which:

FIG. 1 shows a mobile telephony environment according to one or more embodiments of the disclosure.

DETAILED DESCRIPTION

According to FIG. 1, a mobile terminal 1 is shown. A mobile terminal 1 here means a mobile phone, a smart phone (Smartphone), a personal digital assistant (PDA), a laptop, or any device capable of connecting to a wireless cellular mobile telephony network.

Said mobile terminal 1 is located in a geographic area where it is within the range of three networks 2, 2', 2", each one being represented by a cell and each one being identified by a different graphic texture. These three potential visited networks 2, 2', 2", are potentially available and are detected by the mobile terminal 1.

The same mobile terminal 1 has access rights via several host networks 3, 3', 3", represented by labels attached to the mobile terminal 1 and each one being identified by a different graphic texture. Each host network 3, 3', 3" enables to take advantage of the roaming agreements it has negotiated and represented by graphic textures at the bottom of the label, using the graphic textures of the cells of the visited network 2, 2', 2". In at least one embodiment, corresponding to a roaming (travelling) situation, the host networks 3, 3', 3" are not accessible to the terminal mobile 1 from the geographic area wherein it is located, i.e. they are not within the range of the mobile terminal 1.

A first host network 3 thus has a roaming agreement 4 with the visited network 2. It still has a roaming agreement 4''' with the visited network 2'. A second host network 3' has a roaming agreement 4' with the visited network 2". A third host network 3" has a roaming agreement 4" with the visited network 2'.

The mobile terminal 1 thus has the option to connect to the visited network via the host network 3, to the visited network 2" via the host network 3', or the visited network 2' via the host network 3 or the host network 3". In some embodiments, it is then necessary to optimize the selection of connection means by selecting a host network and a visited network.

Thus, in some embodiments in a particularly advantageous manner, the user of the mobile terminal 1 is not limited to those visited networks having roaming agreements with the single host network operator usually attached to a SIM card.

To avoid important and harmful data exchanges with the network of come other configurations and increase reactivity, in some embodiments this optimization is performed according to the disclosure, by a device advantageously located in the mobile terminal 1 itself. Additionally, in some embodiments, the optimization is performed by means of sequencing according to at least one criterion.

According to one embodiment, the device comprises a software application 5 installed in a personal card or a personal token of the mobile terminal, typically a SIM card. In the following description the SIM card will refer to the means wherein software is integrated and possibly a microprocessor although the disclosure is not restrictive to SIM cards only. This software application 5 enables to offer a decision-making autonomy to the main person concerned by the selection of the connection means: the mobile terminal 1 and the user thereof. Advantageously, in some embodiments, the card can be inserted into or removed from the mobile terminal by the user.

Said software application 5 may be performed by means of a Java application housed in the SIM card.

This application analyzes criteria which are local or measurable from the mobile terminal 1, and determines, for example through management rules, "ratings" or relative weights of the various networks, whether visited 2, 2', 2", or host 3, 3', 3" ones. This then makes it possible to determine an optimal visited network and/or an optimal host network, and to connect the mobile terminal 1 to said optimal visited network via said optimal host network to access the desired services under the best conditions of quality, availability and/or cost for the user.

This characteristic then, in some embodiments, advantageously allows carrying out a local, autonomous and especially dynamic selection/arbitration of the host network as well as of the visited network.

At least one embodiment in accordance with this disclosure thus enables to select a visited network among a plurality of visited networks which the mobile terminal has potential access to according to at least one criterion. Other solutions, different from the disclosure might provide, in the best case, a selection of the visited network in a geographic area which would consist in going down a pre-drawn list giving the order of preference of the networks usually present in this area and choosing the visited network having the highest order of preference. Such lists are drawn by the operator of the host network. In these solutions, the selection of the visited network is thus not based on a selection carried out by the terminal nor on a selection using at least one criterion, but is based on a pre-drawn list provided by an entity outside the mobile terminal.

Dynamic here means that a decision agent integrated in the mobile terminal, for example, placed in the SIM card, and therefore relatively independent with respect to the operators can make a host network and/or visited network arbitration at any time, even during a travel and/or a communication according to at least one criterion. Thus a change in the (host and/or visited) network, or even just an update of an order of priority of a (host and/or visited) network may be decided as soon as at least one threshold of at least one criterion is exceeded.

In some embodiments, the dynamic aspect of such arbitration is an important feature. It can be illustrated by the following two examples.

According to a first non restrictive example, a device according to the disclosure is placed aboard a train to provide communication services to the user between Paris and Brussels. At any point of the travel, the device must connect to radio cells to enable data connection (GPRS, 3G data, . . . ) which, according to a first criterion, provides the best available bandwidth in order to provide maximum rate to the user. Throughout the train ride, the device (via an autonomous agent in the SIM) dynamically makes visited networks arbitrations in real time to connect to network cells providing a data connection with the best bandwidth. Meanwhile, along the way, according to the various cells alternately connected with the various operators: SFR, Orange and Bouygues in France, Mobistar, Proximus and Base in Belgium, the device decides, especially when crossing the border between France and Belgium, to connect to Orange, Bouygues, SFR, Mobistar, Proximus, Base, via a host network (Orange, Telecom Italia, Deutsche Telecom, etc.), selected among operators which have signed quality roaming agreements. The selection of the visited network to meet the requested user's communication means and the selection of the host network offering the best conditions for the selected visited networks thus combine in parallel and dynamically.

According to a second non restrictive example, for a stationary use, a surveillance camera connects to a network, typically an Ethernet network through a device according to the disclosure, in order to transmit real-time video. This connection is most often provided by Orange. However, on finishing times, SFR offers a better quality of service. For example, SFR offers a better availability or a better bandwidth. The device according to the disclosure which equips the camera then automatically switches the visited network from Orange to SFR, and later from SFR to Orange. In addition, said device can directly connect to Orange (the visited network) via an agreement with Orange (the host network), and to SFR (the visited network) via an agreement with the Vodafone Group (the host network).

The sequencing of the visited network 2, 2', 2", as well as of the host network 3, 3', 3" is based on a set of sequencing criteria. The sequencing criterion/criteria is/are selected among the criteria affecting the quality, availability and/or cost of the connection for the user.

These criteria can thus be selected among: received power level, type of service provided and real-time availability thereof, available bandwidth, quality of service, latency, time/date, user preference, cost of use, geographic criterion. The received power level determines the quality of the transmission which can be established for a visited network. The type of service provided (GPRS, EDGE, 3G, LTE), the bandwidth available, the quality of service (QoS) determine the service(s) that the user can expect from a connection. Depending on the user's needs, some networks are then promoted in or rejected from the selection process. These criteria may then be involved in the selection process according to the user specifications (e.g. the user may wish to limit performance) or rights (e.g. the user's subscription only gives access to a limited service). Latency is a technical criterion, too, which, beyond a certain value, will block some services. Time and/or date are taken into account to help define different behaviours, for instance as a function of variable needs or different pricing (peak/off-peak hours). The preferences of the user, who may wish to promote a particular network, also belong to those criteria. The cost of use is of course an important criterion to be taken into account. For a similar quality of service, any selection of connection advantageously optimizes cost, or even accepts some reduction in quality providing a substantial reduction in cost. The geographic area can still be taken into account to change the networks sequencing. Other criteria can of course be added and the list given here is indicative only.

In some embodiments, these criteria which may be contradictory are advantageously taken into account by using management rules. These management rules, for example, are as follows:

IF<condition> THEN <action> with

<condition>=(x1 criterion=y1 value) R1 (x2 criterion=y2 value) R2 (x3 criterion=y3 value)

where xi is one of the chosen criteria, and yi is a possible value or value interval for said criterion, and Ri is a Boolean relation among: OR, AND, NET, NOU, NOT, etc., and <action> is an action consisting either of a selection of a preferred network or of a rating or an absolute or relative classification given to a particular network.

In some embodiments, it is thus possible to have a first set of management rules associated with the host network selection/sequencing and a second set of management rules associated with the visited network selection/sequencing.

In some embodiments, it is still possible to have a set of cross rules for achieving a comprehensive and simultaneous optimization of the host network and the visited network.

As indicated in the action field, a management rule may determine a preferred network. According to another embodiment, the sequencing may produce/maintain a list of visited networks and a list of host networks.

In some embodiments, each one of these lists is then ordered by order of preference and dynamically updated according to the selected criteria and their evolution in time. An application of the relevant management rules, based on the values of the criteria enables to update the order of the networks in said list.

For example, in some embodiments, a rule that enhances the presence of a service of high-speed data transmission, can add bonus points to all the networks that provide such a service. The application of said rule changes a rating associated with each network. A classification of networks in descending order of their rating, reorders said networks. After applying all the rules a list of networks is obtained which is ordered by order of preference according to the criteria. The first network in the list is then the preferred candidate to make the connection.

According to a particular embodiment, it is still possible to manage a global optimization of the host network/visited network pair. In this case an ordered list of possible host network/visited network pairs is managed (for which there is a roaming agreement), with the rules applying to the host network, to the visited network or the pair thereof. The first pair of the ordered list is then the preferred candidate to make the connection.

In some embodiments, the criteria and the management rules are locally stored in the mobile terminal 1. In some embodiments, they are advantageously configured by the user of the mobile terminal 1 itself, for example, using a dedicated dialog interface. In some embodiments, it is still possible to download new management rules from the network, for example by means of an OTA protocol, as a substitution of the whole or a part thereof.

In some embodiments, the ordered list(s) of networks is/are conveniently dynamically updated to take account of the evolution in real time of the criteria values.

In some embodiments, this update can be periodically performed according to a given time period.

In some embodiments, this update can be event-performed alternately or in combination. Then an update is advantageously performed when a value of one of the chosen criteria is significantly changed or when a selected event occurs, among: activation of a SIM card, loss of signal, discovery of a signal, activation of a mobile terminal, change in a user preference, or external activation.

Most of these events are locally observed by the mobile terminal 1 itself.

The external activation is an event coming for example from the host network and aiming at causing an update. Such external activation is triggered, for example, by the receipt on the mobile terminal 1 of an SMS or USSD service message. The external activation also includes a specific request for an update by the user.

In some embodiments, the ordered list(s) thus enable(s) to establish a connection by selecting the first network/pair of the/each list.

To avoid the risk of unwanted changes in the visited network 2, 2', 2", and/or the host network 3, 3', 3", which would certainly create problems of continuity of service and an overload of exchanged signalling messages upon each change, in some embodiments, continuity in the use of a network may be preferred. Then either the network change according to the preferred list, or the update of the preference list itself may advantageously be temporally filtered. Such a filtering typically uses a hysteresis filter.

The definition of the criteria and the setting of the threshold values associated with these criteria to arbitrate between the host network and the visited network are so performed as to avoid unnecessary switching. These settings can be refined to optimize the operation rules.

A mobile terminal 1 connects to a guest network 2, 2', 2" via a host network 3, 3', 3". The host network 3, 3', 3" is the network wherein the user has a right of access to the telephone network for his/her mobile terminal 1. Such access is materialized, for example, by a SIM card, and especially by an identifier or an IMSI code identifying said mobile terminal 1 to the host network 3, 3', 3".

As a reminder, IMSI is the acronym of International Mobile Subscriber Identity, for international mobile subscriber identity number.

In some other configurations, an IMSI code is uniquely associated with a SIM card and each host network 3, 3', 3" requires an IMSI code located on a separate SIM card. The IMSI number allows a (typically GSM or UMTS) network to identify the user. This number is stored in the SIM card or the USIM card, respectively. With the solutions of the prior art, the user thus has to change his/her SIM card, or possibly to have a mobile terminal 1 simultaneously accepting multiple SIM cards, to be able to change the host network 3, 3', 3".

According to an advantageous characteristic, in some embodiments, the device according to the disclosure makes it possible to change, in the software program, the identifier or the IMSI code of a mobile terminal 1 in one and the same SIM card.

An IMSI can thus be borrowed from a host network 3, 3', 3" at least for the time required to take advantage of a roaming agreement, to connect to a visited network 2, 2', 2". Thus the selection of a host network 3, 3', 3" includes selecting an IMSI associated with the host network 3, 3', 3" and "Installing" said IMSI as the identifier of the mobile terminal 1, for example in one's SIM card.

Thus a user, typically having a contractual relationship with an operator, may select a host network among a plurality of host networks provided by this operator, with each proposed host network being associated with an identifier/IMSI code in the mobile terminal 1. In some embodiments, the mobile terminal is connected to a single host network at a time. Therefore, at every moment, only one identifier/IMSI code among the identifiers/IMSI codes of the terminal is active/assumed. To disconnect from a first host network and switch to a second host network, one or more embodiments according to the disclosure provides to disable the identifier/IMSI code dedicated to the first host network and to assume the identifier/IMSI code associated with the user and dedicated to the second host network. The user can thus connect to a visited network via the second host network, and thus take advantage of the roaming agreements thereof.

Advantageously, in some embodiments according to the disclosure provides for maintaining a single subscriber profile while using multiple identifiers/IMSI codes. A subscriber profile is typically the profile maintained by the operator with which the user signed a contract to use the teleservices provided via the mobile terminal 1.

In some embodiments, maintaining the same user profile while using multiple identifiers/IMSI codes enables continuity of service and especially continuity of connection whatever the selected networks.

Explanations for maintaining this unique user profile while using multiple identifiers/IMSI codes are given below. For clarity, in the explanations below, the identifiers are IMSI codes without this being restrictive. Subscribers are downloaded in the operator network core as multi-IMSI users. At every moment, each subscriber is uniquely associated with a variable set of IMSI identifiers. On the contrary, each subscriber is associated with a unique MSISDN (acronym for Mobile Subscriber Integrated Services Digital Network Number) which literally means mobile subscriber number allowing him/her to access a digital network service). In a simpler way, the MSISDN is known as the telephone number through which the user can be reached.

In some embodiments, each time the program integrated in the mobile terminal 1 takes the initiative to select a new <host network, identifier of the host network (IMSI), visited network> triplet it advantageously executes, in a way which is transparent to the user, one or more of the following steps:
- logging off of the current session in the visited network. This step includes a procedure for de-registration, typically as a message of the "IMSI detach" type.
- the preparation of the parameters required for the procedure of attachment to the new visited network selected,
- the initiation of a procedure of attachment to the new visited network selected as the new host ID selected, typically as a message of the 'IMSI attach' type.

The procedure of attachment to the new visited network routes the subscriber identification request to the same Operator Information System for all the subscriber's IMSIs associated with this device and more specifically to the SIM card in this mobile terminal. An HLR (the acronym for Home Location Register meaning nominal location register) knows the correspondence between a MSISDN and an IMSI. In accordance with one or more embodiments of the disclosure, the HLR associates a MSISDN to a plurality of IMSIs. Thus, in the core of the Operator Information System, the HLR provides information from the same subscriber profile, whatever the IMSI contained in the request. Among other items of information, the same phone number (MSISDN) is provided by the HLR for all the IMSIs associated with a given subscriber. So this subscriber can be reached at the same number whatever the host identifier (IMSI) under which it registered with the visited network. Tele-services associated with this subscriber profile therefore continue to be available in a transparent way.

According to a particular non restrictive embodiment, the disclosure describes updating the list of potential host networks for the mobile terminal 1 via an OTA (Over The Air) protocol. If a host network must be added, the operator or one of the partners thereof transmits the mobile terminal 1 a new identifier/IMSI corresponding to the new host network.

According to a particular non restrictive embodiment, the identifier/IMSI code is used only temporarily, it is used again for different users. A network server then allocates IMSI codes while keeping, for the time of their allocation, a user/IMSI code correlation table.

One or more embodiments of the disclosure may also be advantageously used in a mobile telecommunications infrastructure to provide a method for determining a coverage mapping of a given geographic area. So if one telecommunications regulator (such as ARCEP=Autorité Française de Régulation des Communications Electroniques et Postes=French Authority for the Regulation of Electronic Communications and Post or OFCOM, an independent authority in the United Kingdom, . . . ) wants to know the (actual) coverage mapping of the operators in a country (beyond the declarative information reported by the operators under their obligations) it can use the information from the disclosure to obtain the mapping of dynamic connection capabilities on all networks, as perceived by the terminals.

It is thus possible, when using the various fixed and/or mobile terminals present in a given geographic area intended to be mapped, to perform an audit to obtain a coverage mapping of all the operators/(visited and host) networks in said geographic area.

For this purpose, in some embodiments, the method implemented in accordance with the disclosure comprises a step of recovering data: visited network, host network, location of the terminal, from fixed or mobile terminals present in the geographic area. In some embodiments, this recovery can be performed on a regular basis, spontaneously sent by each terminal, or upon the occurrence of an event, such as the establishment of a communication.

In some embodiments, to obtain statistically significant mapping information, observation and recovery are preferably maintained during a long enough period of time.

Although a preferred embodiment has been described in the present disclosure, it should be understood that the invention is not limited to this embodiment, and that modifications may be brought therein within the scope of the following claims.

The invention claimed is:
1. A mobile device comprising a processor configured to cause the mobile device to:
   connect to a first host network or a second host network;
   connect to a first visited network or a second visited network based on a determination that the first host network and the second host network are outside a connection range of the mobile device; and
   select a network combination of a plurality of network combinations to facilitate the connection to the first visited network or the second visited network, the plurality of network combinations comprising (1) the first host network and the first visited network, (2) the first host network and the second visited network, (3) the second host network and the first visited network, and (4) the second host network and the second visited network,
   wherein the selection of the network combination of the plurality of network combinations to facilitate the connection to the first visited network or the second visited network is based on a comparison of at least one criterion for each network combination of the plurality of network combinations, the at least one criterion comprising one or more of a latency threshold independent of a power level of a signal associated with the first visited network or the second visited network, a quality of service associated with the network combination, or a cost associated with using the first visited network or the second visited network by way of a selected network combination.

2. The mobile device according to claim 1, further comprising:
   a card or a chip comprising:
      a non-transitory computer-readable storage medium having computer-executable instructions stored thereon; and
      a microcontroller configured to execute the computer-executable instructions to cause the processor to select the network combination to facilitate the connection to the first visited network or the second visited network.

3. The mobile device according to claim 2, wherein the card or the chip is removably inserted into the mobile device.

4. The mobile device according to claim 1, wherein
the mobile device comprises, for each of the first host network and the second host network, an identifier uniquely identifying the mobile device, and
the processor is further configured to cause the mobile device to use the network identifier associated with the first host network or the second host network included in the selected network combination to identify which of the first host network or the second host network is a basis for providing connectivity to the first visited network or the second visited network included in the selected network combination.

5. The mobile device according to claim 4, wherein the identifier is an IMSI number (the international mobile subscriber identity number).

6. The mobile device according to claim 5, wherein a unique MSISDN number is associated with all the IMSI numbers uniquely identifying the mobile device.

7. The mobile device according to claim 1, wherein the at least one criterion comprises:
a first criterion associated with selecting the first visited network or the second visited network of the selected network combination; and
a second criterion associated with selecting the first host network or the second host network of the selected network combination,
wherein the second criterion is different from the first criterion.

8. The mobile device according to claim 1, wherein the at least one criterion comprises:
a first criterion associated with selecting the first visited network or the second visited network of the selected network combination; and
a second criterion associated with selecting the first host network or the second host network of the selected network combination,
wherein the first criterion is from a same category of criteria as the second criterion such that the mobile device is caused to take into account at least one common criterion to carry out the selection of the selected network combination.

9. The mobile device according to claim 1, wherein the at least one criterion further comprises:
the power level of the signal associated with the first visited network or the second visited network,
a type of service provided by the first visited network or the second visited network,
a bandwidth provided by the first visited network or the second visited network,
a user preference, or
a geographic location of the mobile device.

10. The mobile device according to claim 1, wherein the processor is further configured to cause the mobile device to take into account measurements made by the mobile device to evaluate the at least one criterion.

11. The mobile device according to claim 1, wherein the processor is further configured to cause the mobile device to determine a value of the power level of the signal associated with the first visited network or the second visited network, or a value of a bandwidth of a connection with the first visited network or the second visited network.

12. The mobile device according to claim 1, wherein the processor is further configured to cause the mobile device to apply one or more management rules rating each network combination of the plurality of network combinations for facilitating the connection to the first visited network or the second visited network according to said at least one criterion.

13. The mobile device according to claim 1, wherein said processor is further configured to cause the mobile device to produce a list of visited networks and a list of host networks available to be included as the first host network, the second host network, the first visited network, or the second visited network in a selectable network combination of the plurality of network combinations in an order of preference.

14. The mobile device according to claim 13, wherein the processor is further configured to cause the mobile device to periodically update said ordered lists.

15. The mobile device according to claim 13, wherein the processor is further configured to cause the mobile device to update the ordered lists upon the occurrence of at least one event comprising:
activation of a SIM card,
loss of a signal,
discovery of a signal,
activation of the mobile device
change a user preference,
external activation, or
reception of a call or a message.

16. The mobile device according to claim 13, wherein the processor is further configured to cause the mobile device to update said list of visited networks or said list of host networks in accordance with a temporal filter to avoid changes in the selected network combination through which the mobile device is connected to the first visited network or the second visited network.

17. The mobile device according to claim 1, wherein the processor is further configured to cause the mobile device to select the network combination by selecting the first visited network or the second visited network and selecting the first host network or the second host network at different times.

18. The mobile device according to claim 17, wherein the processor is further configured to cause the mobile device to change the selected network combination by selecting the first visited network or the second visited network and selecting the first host network or the second host network at different frequencies.

19. The mobile device according to claim 1, wherein the processor is further configured to cause the mobile device to select the network combination by selecting the first visited network or the second visited network and selecting the first host network or the second host network simultaneously.

20. The mobile device according to claim 1, wherein
the mobile device has access to the first visited network based on at least one of (1) a first agreement between a provider of the first host network and a provider of the first visited network or (2) a second agreement between a provider of the second host network and the provider of the first visited network,
the mobile device has access to the second visited network based on at least one of (1) a third agreement between the provider of the first host network and a provider of the second visited network or (2) a fourth agreement between the provider of the second host network and the provider of the second visited network,
the cost associated with using the first visited network is based on the first agreement or the second agreement, and the cost associated with using the second visited network is based on the third agreement or the fourth agreement.

21. The mobile device according to claim 20, wherein the first visited network and the second visited network are among a plurality of visited networks, the first host network has a fifth agreement with a third visited network of the plurality of visited networks, the second host network is lacking an agreement with the third visited network, and the processor is configured to cause the mobile device to select the network combination to facilitate the connection to the first visited network, the second visited network or the third visited network.

22. The mobile device according to claim 1, wherein the processor is further configured to cause the mobile device to dynamically select the network combination to facilitate the connection to the first visited network or the second visited network.

23. A method, comprising:
   causing, by a processor, a mobile device to connect to a first visited network or a second visited network based on a determination that a first host network and a second host network are outside a connection range of the mobile device; and
   selecting a network combination of a plurality of network combinations to facilitate the connection to the first visited network or the second visited network, the plurality of network combinations comprising (1) the first host network and the first visited network, (2) the first host network and the second visited network, (3) the second host network and the first visited network, and (4) the second host network and the second visited network,
   wherein the selection of the network combination of the plurality of network combinations to facilitate the connection to the first visited network or the second visited network is based on a comparison of at least one criterion for each network combination of the plurality of network combinations, the at least one criterion comprising one or more of a latency threshold independent of a power level of a signal associated with the first visited network or the second visited network, a quality of service associated with the network combination, or a cost associated with using the first visited network or the second visited network by way of a selected network combination.

24. The method according to claim 23, further comprising:
   selecting the network combination based on geographic location of the mobile device.

25. The method according to claim 23, wherein each of the first host network and the second host network is associated with an identifier uniquely identifying the mobile device, and the method further comprises:
   using the identifier associated with the first host network or the second host network included in the selected network combination to identify which of the first host network or the second host network is a basis for providing connectivity to the first visited network or the second visited network included in the selected network combination.

26. The method according to claim 23, wherein a unique call number (MSISDN) is associated with each identifier uniquely identifying the mobile device, and a database is maintained wherein the MSISDN unique to the mobile device is associated with the identifier associated with the first host network or the second host network.

27. The method according to claim 23, further comprising:
   determining, by a regulator, a coverage mapping of a given geographic area based on one or more of the network combination selected by the mobile device, a mobile device location, or data received from a fixed terminal or one or more mobile terminals present in the geographic area.

28. A computer program product comprising instructions capable of being executed by a computer, with said instructions allowing implementing the method according to claim 23.

29. A card comprising a microprocessor and storage means comprising a computer program containing instructions allowing implementing the method according to claim 23.

30. The card according to claim 29, wherein the card is configured to be removably inserted into the mobile device.

31. The mobile device method according to claim 23, wherein
   the mobile device has access to the first visited network based on at least one of (1) a first agreement between a provider of the first host network and a provider of the first visited network or (2) a second agreement between a provider of the second host network and the provider of the first visited network,
   the mobile device has access to the second visited network based on at least one of (1) a third agreement between the provider of the first host network and a provider of the second visited network or (2) a fourth agreement between the provider of the second host network and the provider of the second visited network, and
   the selection of the network combination to facilitate the connection to the first visited network or the second visited network is based on the cost associated with using the first visited network based on the first agreement, the cost associated with using the first visited network based on the second agreement, the cost associated with using the second visited network based on the third agreement, and the cost associated with using the second visited network based on the fourth agreement.

* * * * *